US009255988B2

United States Patent
Zeng et al.

(10) Patent No.: US 9,255,988 B2
(45) Date of Patent: Feb. 9, 2016

(54) OBJECT FUSION SYSTEM OF MULTIPLE RADAR IMAGING SENSORS

(71) Applicant: GM GLOBAL TECHNOLOGY OPERATIONS LLC, Detroit, MI (US)

(72) Inventors: Shuqing Zeng, Sterling Heights, MI (US); Jeremy A. Salinger, Southfield, MI (US); Bakhtiar B. Litkouhi, Washington, MI (US); Kevin A. O'Dea, Ann Arbor, MI (US); Joel Pazhayampallil, Bellerose, NY (US); Mohannad Murad, Troy, MI (US); James N. Nickolaou, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 122 days.

(21) Appl. No.: 14/156,681

(22) Filed: Jan. 16, 2014

(65) Prior Publication Data

US 2015/0198711 A1 Jul. 16, 2015

(51) Int. Cl.
| | |
|---|---|
| *G01S 13/66* | (2006.01) |
| *G01S 13/87* | (2006.01) |
| *G01S 13/93* | (2006.01) |
| *G01S 13/90* | (2006.01) |
| *G01S 13/72* | (2006.01) |

(52) U.S. Cl.
CPC .............. *G01S 13/66* (2013.01); *G01S 13/726* (2013.01); *G01S 13/878* (2013.01); *G01S 13/9029* (2013.01); *G01S 13/931* (2013.01); *G01S 2013/9375* (2013.01); *G01S 2013/9378* (2013.01)

(58) Field of Classification Search
CPC ....... G01S 13/66; G01S 13/72; G01S 13/723; G01S 13/726; G01S 13/87; G01S 13/878; G01S 13/88; G01S 13/89; G01S 13/90; G01S 13/9029; G01S 13/93; G01S 13/931; G01S 2013/9371; G01S 2013/9375; G01S 2013/9378; G01S 13/003; G01S 13/02; G01S 13/06; G01S 13/08; G01S 13/32; G01S 13/34; G01S 13/345; G01S 15/88; G01S 15/93; G01S 15/931; G05D 1/02; G05D 1/0202
USPC ............. 342/27, 28, 59, 73–81, 89–115, 118, 342/146, 147, 175, 195, 25 R–25 F, 145, 342/157; 180/167–169; 340/425.5, 435
See application file for complete search history.

(56) References Cited

U.S. PATENT DOCUMENTS

| | | | | |
|---|---|---|---|---|
| 4,818,999 A | * | 4/1989 | Kobayashi | ............... G01S 13/93 342/59 |
| 5,087,918 A | * | 2/1992 | May | ...................... G01S 13/931 342/70 |

(Continued)

*Primary Examiner* — Bernarr Gregory

(57) ABSTRACT

A method of detecting and tracking objects using multiple radar sensors. Objects relative to a host vehicle are detected from radar data generated by a sensing device. The radar data includes Doppler measurement data. Clusters are formed, by a processor, as a function of the radar data. Each cluster represents a respective object. Each respective object is classified, by the processor, as stationary or non-stationary based on the Doppler measurement data of each object and a vehicle speed of the host vehicle. Target tracking is applied, by the processor, on an object using Doppler measurement data over time in response to the object classified as a non-stationary object; otherwise, updating an occupancy grid in response to classifying the object as a stationary object.

17 Claims, 6 Drawing Sheets

(56) References Cited

U.S. PATENT DOCUMENTS

| | | | | |
|---|---|---|---|---|
| 5,574,463 A * | 11/1996 | Shirai | G01S 13/93 | 342/70 |
| 5,598,163 A * | 1/1997 | Cornic | G01S 13/931 | 342/70 |
| 5,652,589 A * | 7/1997 | Ono | G01S 13/345 | 342/70 |
| 5,754,099 A * | 5/1998 | Nishimura | G01S 13/931 | 342/70 |
| 5,986,601 A * | 11/1999 | Sugimoto | G01S 13/931 | 342/109 |
| 6,121,916 A * | 9/2000 | McDade | G01S 13/931 | 342/114 |
| 6,249,243 B1 * | 6/2001 | Takagi | G01S 13/931 | 342/108 |
| 6,317,073 B1 * | 11/2001 | Tamatsu | G01S 13/931 | 342/109 |
| 6,380,884 B1 * | 4/2002 | Satou | G01S 13/931 | 342/147 |
| 6,469,656 B1 * | 10/2002 | Wagner | G01S 13/931 | 342/104 |
| 6,518,916 B1 * | 2/2003 | Ashihara | G01S 13/931 | 342/133 |
| 6,522,286 B1 * | 2/2003 | Ashihara | G01S 13/931 | 342/118 |
| 6,628,227 B1 * | 9/2003 | Rao | G01S 13/931 | 342/70 |
| 6,888,622 B2 * | 5/2005 | Shimomura | G01S 13/931 | 180/169 |
| 6,992,613 B2 * | 1/2006 | Yoneda | G01S 13/878 | 342/118 |
| 7,071,867 B2 * | 7/2006 | Wittenberg | G01S 13/726 | 342/157 |
| 7,095,361 B2 * | 8/2006 | Mattes | G01S 13/87 | 180/167 |
| 7,248,153 B2 * | 7/2007 | Danz | G01S 15/931 | 340/435 |
| 7,443,335 B2 * | 10/2008 | Kai | G01S 13/931 | 342/104 |
| 7,460,951 B2 | 12/2008 | Altan et al. | | |
| 7,518,545 B2 * | 4/2009 | Minichshofer | G01S 13/931 | 342/59 |
| 7,525,478 B2 * | 4/2009 | Takano | G01S 13/878 | 342/145 |
| 7,714,769 B2 * | 5/2010 | Jordan | G01S 13/931 | 340/435 |
| 7,737,880 B2 * | 6/2010 | Vacanti | G01S 13/931 | 342/100 |
| 7,889,116 B2 * | 2/2011 | Harada | G01S 13/87 | 342/59 |
| 8,648,744 B2 * | 2/2014 | Koike | G01S 13/931 | 342/70 |
| 8,717,225 B2 * | 5/2014 | Sasabuchi | G01S 13/931 | 342/107 |
| 8,818,703 B2 * | 8/2014 | Harada | G01S 13/931 | 342/59 |
| 8,825,266 B2 * | 9/2014 | Naderhirn | G05D 1/0202 | 342/109 |
| 9,030,349 B2 * | 5/2015 | Mizutani | G01S 13/931 | 342/118 |

* cited by examiner

US 9,255,988 B2

OBJECT FUSION SYSTEM OF MULTIPLE RADAR IMAGING SENSORS

BACKGROUND OF INVENTION

An embodiment relates to object sensor fusion.

Radar systems are used to detect objects within the road of travel. Such systems utilize continuous or periodic tracking of objects over time to determine various parameters of an object. Often times, data such as object location, range, and range rate are computed using the data from radar systems. However, inputs from radars are often sparse tracked targets. Moreover, radar systems are often predicated on assuming the target is a single point which makes it even more difficult to assess for close-by-targets.

SUMMARY OF INVENTION

An advantage of an embodiment is the enhanced tracking of an objects position and orientation relative to a host vehicle. The host vehicle utilizes Doppler measurement data to determine which portions of the radar data form a cluster as well as determining whether the cluster is stationary or dynamic. Tracking a position and the shape of the object allows the host vehicle to determine the orientation of the object during each time frame. Since an objects shape will change as seen by host vehicle, based on the changes of the shape, the orientation may be determined at each instance of time and tracked accordingly. As a result, the respective tracking system may communicate the remote vehicle orientation, position, and speed to other vehicle subsystems for their use with objects exterior of the vehicle.

An embodiment contemplates a method of detecting and tracking objects using multiple radar sensors. Objects relative to a host vehicle are detected from radar data generated by a sensing device. The radar data includes Doppler measurement data. Clusters are formed, by a processor, as a function of the radar data. Each cluster represents a respective object. Each respective object is classified, by the processor, as stationary or non-stationary based on the Doppler measurement data of each object and a vehicle speed of the host vehicle. Target tracking is applied, by the processor, on an object using Doppler measurement data over time in response to the object classified as a non-stationary object; otherwise, updating an occupancy grid in response to classifying the object as a stationary object.

BRIEF DESCRIPTION OF DRAWINGS

FIG. 4b is a residue histogram for determining dynamic or stationary target in FIG. 4a.

DETAILED DESCRIPTION

Figure 1:
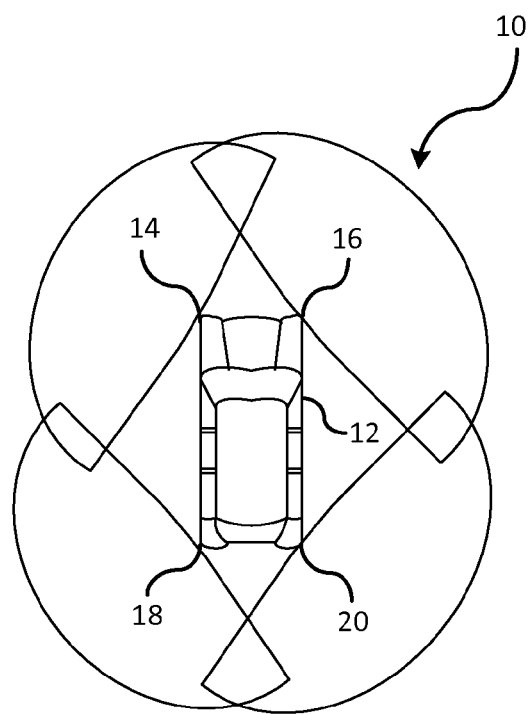
FIG. 1 is a pictorial illustration of a vehicle surround sensing system.

FIG. 1 illustrates a vehicle surround sensing system 10 for detecting objects 360 degrees around a vehicle 12. The system 10 includes a first sensing device 14, a second sensing device 16, a third sensing device 18, and a fourth sensing device 20. Each of the sensors detects objects within a sensed region surrounding the vehicle 12. The data from each of the sensors are fused to cooperatively track objects exterior of the vehicle 12. It should be understood that the number of sensors as shown in FIG. 1 is exemplary, and either one or a plurality of sensors may be used without deviating from the scope of the invention.

Short range radar sensors are traditionally narrow band and have issues when sensing objects that represent a dense scene or close-by extended objects to lack of range. For example, for a host vehicle driving down a highway with a remote vehicle on one side of the host vehicle and a guard rail on the other side of the vehicle, such objects are difficult to distinguish when utilizing data from short range radar sensors. That is, the resolution of both objects looks the same such that it cannot be determined whether either object is dynamic or stationary. This is due to point target assumption used in tracking which is not adequate due to difficulties in data association.

In FIG. 1, each of the sensing devices 14-20, include synthetic aperture radar (SAR) imaging devices which have high resolution to detect and track long extensible objects such as guard rails, concrete barriers, and trucks. Moreover, the SAR includes Doppler measurements that can be used to distinguish a stationary object from a dynamic object. After the objects are classified as stationary or dynamic, the objects can be tracked through contour matching between adjacent frames to constantly monitor orientation of the vehicle. In addition, wheel hub detection may be used for enhancing the position of the object if the object is a vehicle.

Figure 2:
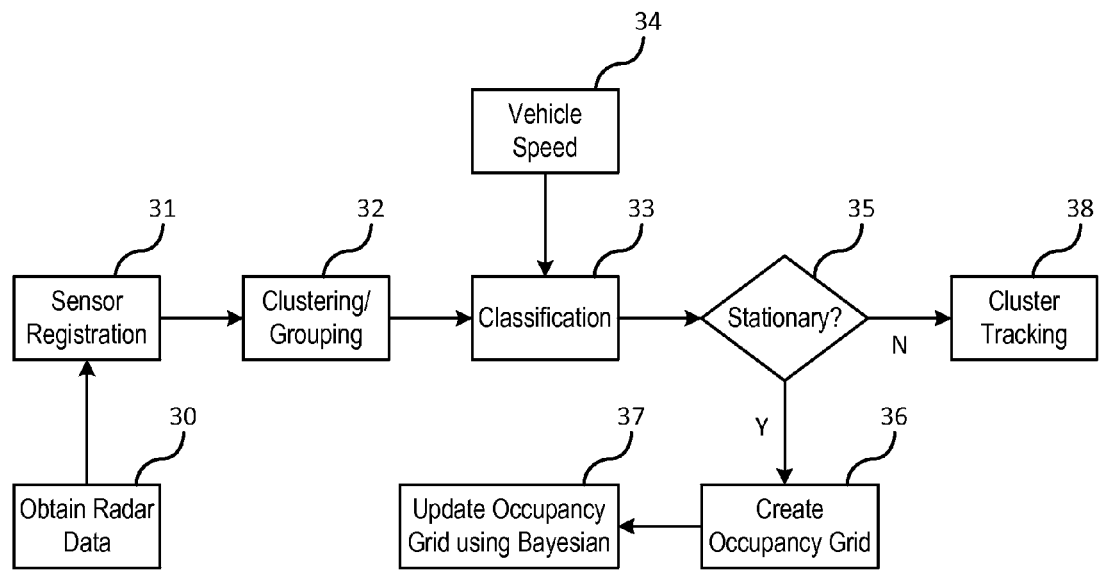
FIG. 2 illustrates a block diagram of an overview for cluster tracking.

FIG. 2 illustrates a block diagram of an overview for cluster tracking. The circles denote the radar reflectors from the front remote moving vehicle, while the squares denote the radar reflectors from stationary road side objects. Since these two groups have different attributes of relative radial speed, the two groups are clustered into two clusters: vehicle vs. stationary road-side object (i.e., guard rail).

In block 30, radar data is obtained by object detection sensors. As described earlier, the object detection sensors are preferably SAR sensors; however, other sensors that obtain similar data may be used. One or more SAR sensors may be used to detect objects surrounding the vehicles. It should be understood that the SAR is a form of radar whose defining characteristic is its use of relative motion (between an antenna and its target region) to provide distinctive long-term coherent-signal variations for exploiting spatial resolution in contrast to conventional radar systems.

SAR is mounted on the host vehicle, which is a moving platform, and generates a single beam-forming antenna. A scene (e.g., target region) is repeatedly illuminated with pulses of radio waves. The waveforms are successively received at the various antenna positions as a result of the host vehicle moving. Such positions are coherently detected, stored, and cooperatively processed to detect objects in an image of the target region. It should be understood that each received waveform corresponds to a radar point as opposed to the entire object. Therefore, a plurality of waveforms is received representing different radar points as opposed to the entire object. As a result, it is uncertain when viewing the raw data as to whether neighboring points represent a same object or different objects. Therefore, each point is considered its own entity/cluster during this step.

In block 31, sensor registration is performed. Sensor registration is a process of transforming different sets of data under one coordinate system. Registration is necessary in order to be able to integrate and compare data obtained from different sensors.

Figure 3:
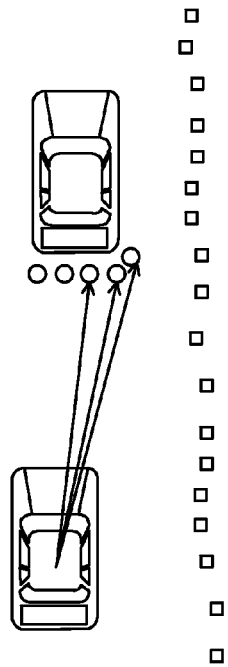
FIG. 3 is an exemplary illustration of radar detecting a target vehicle.

In block 32, clustering is applied to the each position detected in the radar data by a processor. Position alone cannot distinguish two detected neighboring positions. For example, in FIG. 3, a host vehicle 12 transmits radar signals for detecting objects exterior of the vehicle. As shown in FIG. 3, the set of squares represents a guard rail 42 and the set of dots represents a rear end of a remote vehicle 44. However, by viewing the radar data as a whole, it cannot be determined which respective dots is part of which object. As a result, Doppler measurement data may be used to distinguish clusters from one another. Doppler radar is a specialized radar that makes use of the Doppler effect to produce velocity data about objects at a distance. A microwave signal is transmitted towards a desired target, and a receiver listens for the reflection of the signal and then analyzes how the frequency of the returned signal has been altered by the object's motion.

In block 32, to determine whether a set of points are within a same cluster, the following clustering technique is used by the processor. First, all detected points from the radar data are initially treated as separate clusters. Each point is a 3-D point in space (x, y, d) where x is a latitude coordinate relative to the host vehicle, y is a longitudinal coordinate relative to the host vehicle, and d is Doppler data which provides radial velocity information relative to the host vehicle. Secondly, each point is compared to its neighboring point. If a similarity metric between a respective point and its neighbor is less than a similarity threshold, then the two points are merged into a single cluster. If the similarity metric is greater than a similarity threshold, then the two points remain separate clusters. As a result, one or more clusters are formed for each of the detected points. To speed up this technique, radar points may be indexed using a k-d tree or a hash look-up table.

In block 33, classification is applied, by a classifier, to the clusters for determining whether each identified cluster is a stationary object (ground speed zero) or a dynamic object (ground speed not zero). Classification may be performed utilizing the processor that clusters the radar data or may be a separate processing unit. To determine whether an object is stationary or dynamic, vehicle speed of the host vehicle and Doppler measurement data is utilized. The vehicle speed data of the host vehicle is obtained in block 34. It should be understood that any device or process may be used for determining the speed of the host vehicle (e.g., examples of such devices include, but are not limited to, wheel speed sensor, engine speed sensor, GPS.

To initiate the classification technique in block 33, it is first assumed that the cluster being analyzed is stationary. The cluster is represented by a list of dots $(x_i, y_i, d_i)$ i=1, ..., N where $x_i$, $y_i$, $d_i$ are a location and radial speed of radar reflectors from a contour of the target. The check is performed to determine if a predetermined percentage, preferably 80%, of a predicted range rate matches with actual Doppler measurements. If 80% of the residue values are within a threshold, than a determination is made that the cluster is stationary, otherwise, the cluster is determined to be dynamic.

To determine the residue value of the range rate, the host vehicle kinematics are denoted by the host vehicle speed $v_H$ and the host vehicle yaw rate $\omega_H$. For a stationary target, the detected radar points are moving in velocities $\vec{v}_i$. This velocity may be determined using the following formulas:

$$v_{xi} = y_i \omega_H - v_H$$

$$v_{yi} = -x_i \omega_H$$

If unit vector from the radar center to the $i_{th}$ point is represented by $\vec{n}_i$, then the range rate residue $\vec{v}_i$ for an $i_{th}$ point may be represented by the following equation:

$$\epsilon_i = |\vec{v}_i \cdot \vec{n}_i - d_i|,$$

Therefore, using 80% as the exemplary predetermined percentage value, if 80% of the residue values are within a residue threshold, such as 0.5 m/s, then the cluster is identified as a stationary cluster; otherwise the cluster is identified as a dynamic cluster.

Figure 4A:
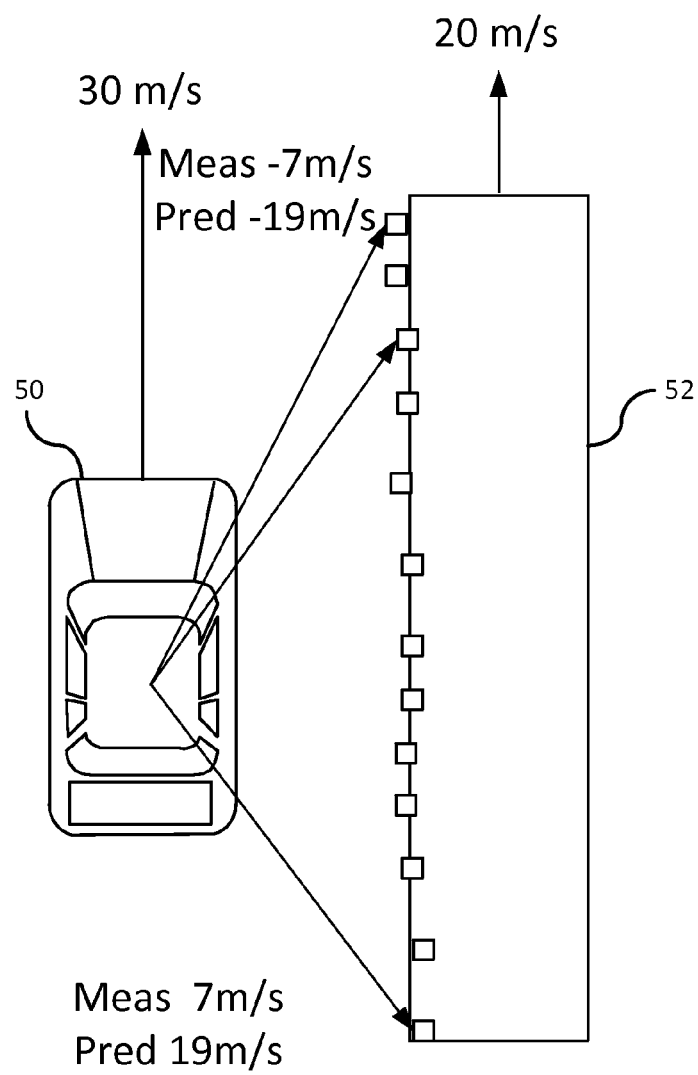
FIG. 4a is an exemplary illustration of radar detecting a moving target

FIGS. 4a and 4b and 5a and 5b illustrate examples of classifying a dynamic cluster and a stationary cluster, respectively. In FIG. 4a, a vehicle 50 travels adjacent to a truck 52 where both vehicles have a ground speed greater than zero. For this example, the host vehicle is traveling 30 m/s whereas the truck 52 is traveling 20 m/s. The host vehicle 50 transmits a radar beam which reflects off of the truck 52 at different points using the SAR devices. As described earlier, the host vehicle 50 initially assumes that the cluster is a stationary cluster. In this example, the predicted difference if the truck was stationary is for example, −19 m/s for points in the cluster forward of the host vehicle 52 and 19 m/s for points of the cluster rearward in the host vehicle 52. In response to receiving the reflected radar signals, Doppler measurement data indicates that the cluster (i.e., truck 52) has a difference of −7 m/s and 7 m/s.

Figure 4B:
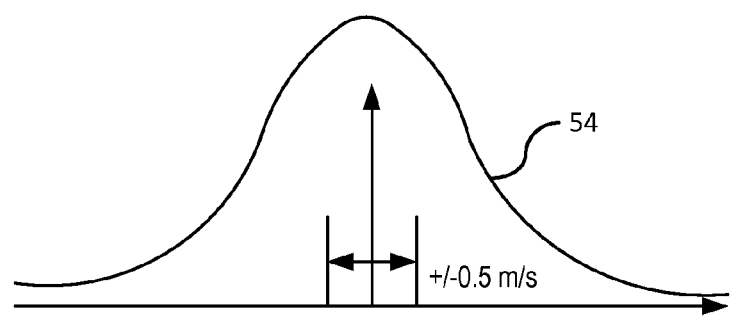

FIG. 4b illustrates a residue histogram for the Doppler measurement data. Element 54 (e.g., +/−0.5 m/s) represents the residue threshold. As shown in FIG. 4b, well over 80% of the values are not within the residue threshold range. Therefore, the cluster (i.e., truck 52) is identified as a dynamic cluster.

Figure 5A:
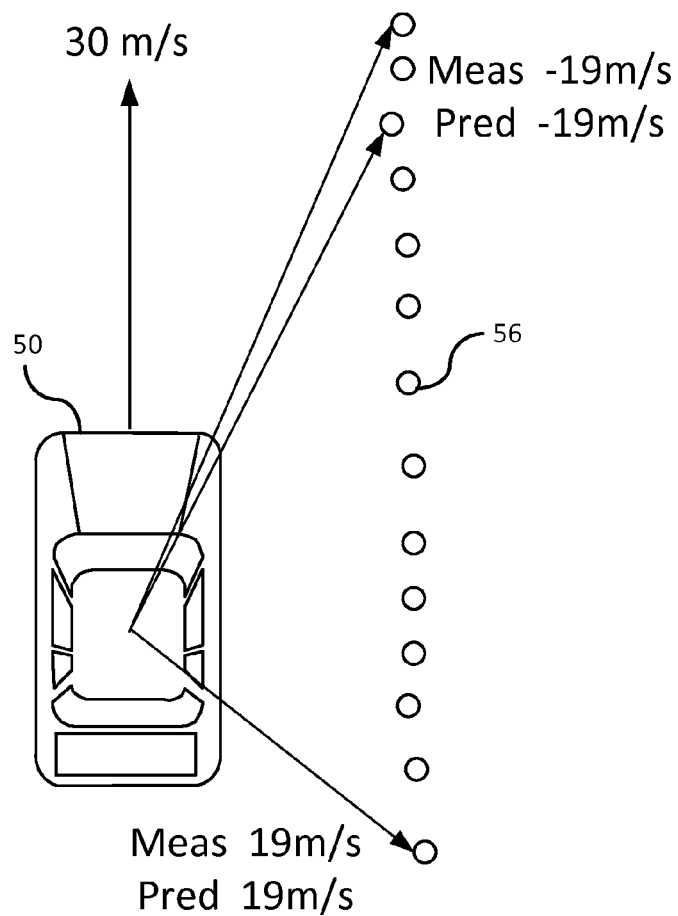
FIG. 5a is an exemplary illustration of radar detecting a stationary target.

FIG. 5a illustrates the vehicle 50 traveling adjacent to a guardrail 56 where the vehicle 50 has a ground speed greater than zero and the guardrail has a ground speed of zero. The host vehicle 50 initially assumes that the adjacent cluster is a stationary cluster. Therefore, the predicted difference if the guardrail is stationary would be −19 m/s for points in the cluster forward of the host vehicle 52 and 19 m/s for points in the cluster rearward of the host vehicle 52. In response to receiving the reflected radar signals, Doppler measurement data indicates that the cluster (i.e., guard rail 56) has a difference of −19 m/s and 19 m/s. This correlates with the predicted speed.

Figure 5B:
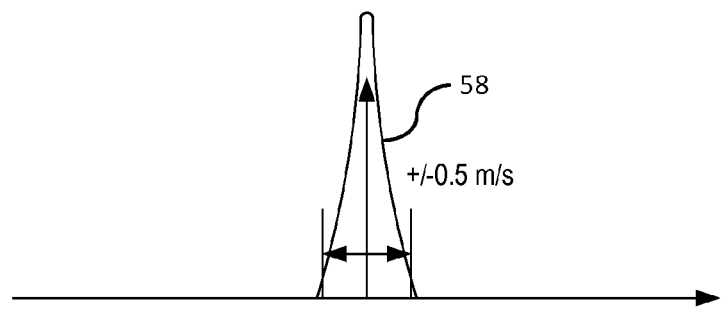
FIG. 5b is a residue histogram for determining dynamic or stationary target in FIG. 5b.

FIG. 5b illustrates a residue histogram for the Doppler measurement data. Element 58 (i.e., +/−0.5 m/s) represents the residue threshold if the cluster is stationary. As shown in FIG. 5b, well over 80% of the values are within the threshold range. As a result, the cluster is identified as a stationary cluster.

Referring again to FIG. 2, in block 35, a determination is made, by the processor, as to whether the cluster is stationary based on the classification identified in block 33. If the cluster is determined as stationary, the routine proceeds to block 36; otherwise, the routine proceeds to block 37.

In block 36, an occupancy grid is generated by the processor. This identifies all stationary objects within the region exterior of the vehicle that have been detected by the sensors. Since the objects are stationary, they do not need to be tracked for movement, so their occupancy with respect to their position within a scan map is updated.

In block 37, a Bayesian rule is used to update the occupancy grid.

Referring again to block 35, if the cluster was found not to be stationary, then the routine proceeds to step 38 to track the cluster. To track the cluster, the SAR image radar provide radar location points that make up the shape of the cluster and Doppler measurement data to track the contour of the cluster as seen by the SAR object detection devices. For the purposes herein, point target assumption such as a vehicle maintaining a regular shape is not held as an assumption which is the reason traditional Kalman filters or particle filters would have difficulty in data association.

Figure 6:
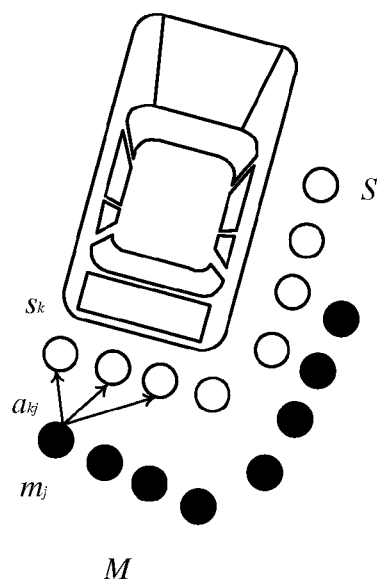
FIG. 6 is an exemplary illustration of radar data traced over time for a vehicle.

To track a cluster, a rigid transformation between two adjacent frames must be solved for using radar measurement matching including longitudinal displacement, lateral displacement, and Doppler. FIG. 6 illustrates a set of points detected for a cluster at a previous instance of time (M) and a set of points detected for a cluster at a current instance of time (S). Given the input of object model M based of the previous radar map, a current radar map S, and a prior rigid motion determination v from M to S, a current rigid motion v is determined.

A 2-dimensional rigid motion has both linear speed $v_t$ and angular speed $\omega$. Therefore, the following formula can used to iteratively compute the updated rigid motion v' until convergence is obtained.

$$v' = \mathrm{argmin}_v \sum_{kj} a_{kj}\left(\frac{\|s_k - T_v(m_j)\|^2}{\sigma_1} + \frac{\|d_k - v_j \cdot n_j\|^2}{\sigma_2}\right)$$

where $s_k$ is a radar point, $m_j$ is a model point, $T_v(x)$ is an operator applying rigid motion during v during $\Delta t$ for a point x, $\alpha_{kj}$ is the probability that radar point $s_k$ is associated with model point $m_j$ (i.e., the measurement of the model point $m_j$), $d_k$ is the Doppler measurement of the point $s_k$, $n_j$ is the unit direction from the radar center to the model point $m_j$, and $v_j$ is the related velocity for the model point $m_j$. It should be noted that in the above equation, the term $$\frac{\|d_k - v_j \cdot n_j\|^2}{\sigma_2}$$

is the Doppler term.

The related velocity term $v_j$ for the model point $m_j$ can be computed as follows:

$v_j = v_t + (m_j - o) \times \omega$ where $(v_t, \omega)$ are translation and angular velocities in rigid motion v.

Rigid transformation is used to cooperatively verify a location and orientation objects detected by the radar devices between two instances of time. As a result, orientation of the vehicle using the plurality of tracking points allows the vehicle position and orientation to be accurately tracked.

In block 40, output devices including, but not limited to, collision warning devices and systems obtain the tracking data for tracking potential collisions with other vehicles and alerting the drive accordingly.

Figure 7:
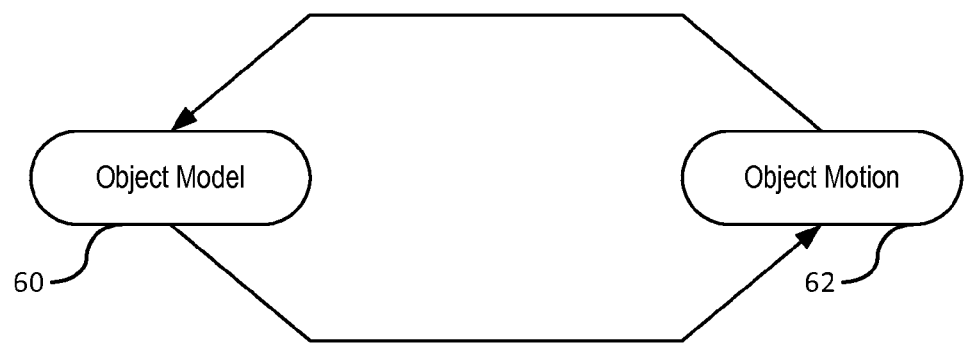
FIG. 7 is a flow diagram for updating an object model and object motion.
Figure 8:
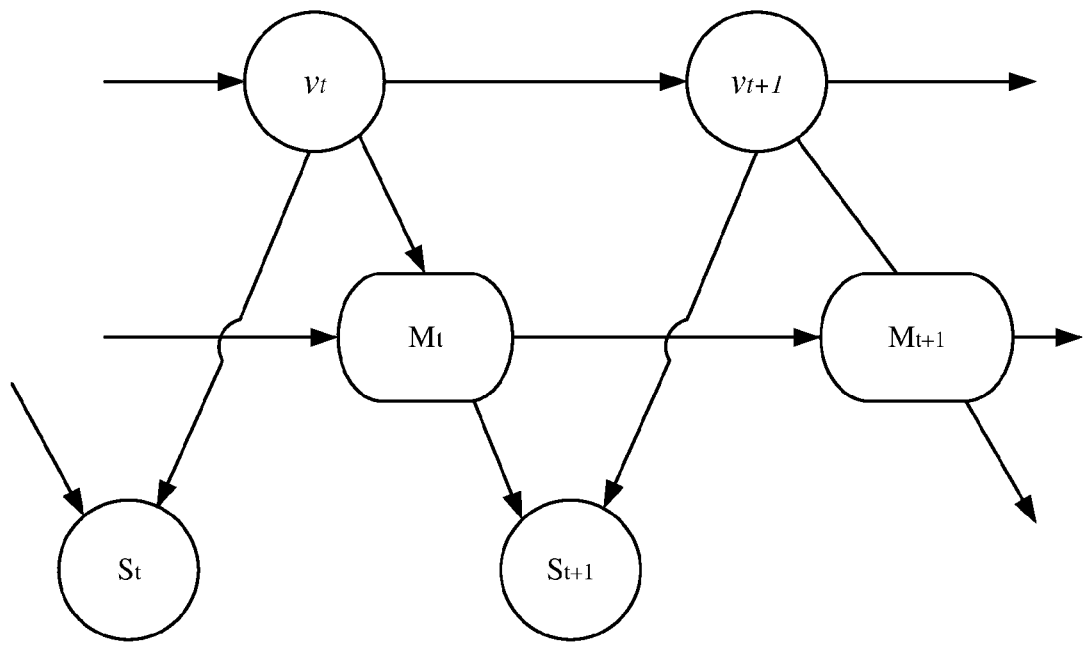
FIG. 8 is a flow diagram of a Bayesian network tracking technique.

FIGS. 7 and 8 illustrate a broad overview of the framework for fusing information for a dynamic cluster. FIG. 7 illustrates a block flow diagram where tracking can be treated as the problem of both (i) estimating the motion of the object, and (ii) updating the object model when a new frame of radar scan map is received. As shown in FIG. 7, an object model is shown at 60 and object motion estimation is shown at 62. The object motion is recursively estimated utilizing the object model whereas the object model is recursively updated using the object motion estimation.

FIG. 8 illustrates a dynamic Bayesian network representing two steps of the tracking technique described herein. For the tracking technique, the routine lets $S_0, \ldots, S_t$, and $S_{t+1}$ be radar maps sampled form a dynamic cluster at times time steps $0\ldots, t$, and $t+1$, respectively. $v_t$, and $v_{t+1}$ are parameters (to be estimated) of the rigid transformation at time steps t, and t+1, respectively. $M_t$, and $M_{t+1}$ are object models at time steps t, and t+1, respectively.

For a current time step (t), the transformation parameter estimated for the current time step (t) is applied to the object model for the current time step (t) and the also the radar map at current time step (t). Similarly, going forward in time for a next time step (t+1), the transformation parameter estimated for the next time step (t+1) is applied to the object model for the next time step (t+1) and the also the radar map at next time step (t+1). The result is a Bayesian-based technique that recursively estimates the motion and updates the object model for tracking based on rigid transformation parameters.

Figure 9:
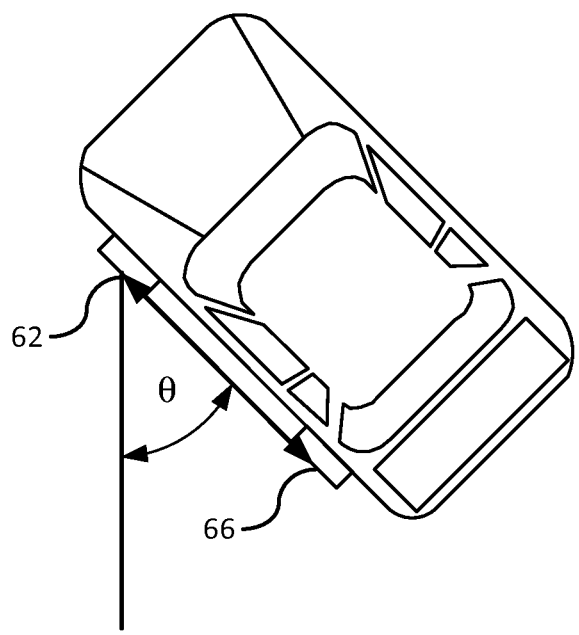
FIG. 9 is an illustration of dynamic target locating system using wheel hubs of a vehicle.
Figure 10:
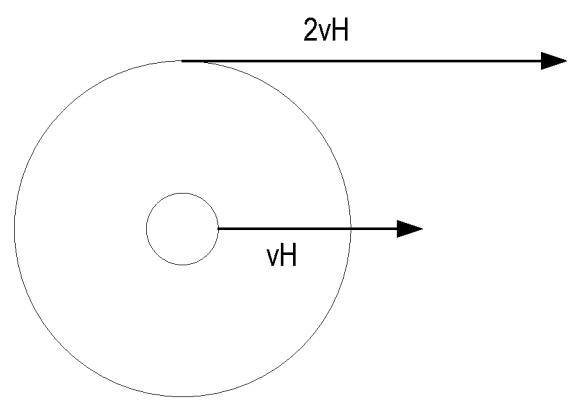
FIG. 10 is an of a wheel hub for determining velocity of a vehicle.

FIG. 9 illustrates dynamic target location system by tracking the vehicle using the wheel hub of the vehicle. The position of two wheel hubs can be used to determine a position of a target vehicle for enhancing a location of the vehicle for use in the target tracking technique described herein. Since wheel hubs are good reflectors, radar data obtained from the SAR system provides more accurate data. Wheel hubs move different speeds relative to the vehicle body. FIG. 10 illustrates the velocity of a wheel hub at different locations of the wheel hub. For example, the velocity at an outer portion of the wheel hub will have a velocity two times the velocity at a center of the wheel hub.

Referring again to FIG. 9, two radar points 60 and 62 are identified as wheel hubs of a target vehicle using maximum Doppler measurements. A baseline width (W) is computed between the two hubs. An orientation $\theta$ is determined between the first point 60 and the second point 62. Utilizing the first hub 60 as the apex of the orientation angle $\theta$, the segment between the drawn between the first hub 60 and the second hub 62 and the vector in which the radar beam transmitted by the host vehicle hits the first hub 60 establishes the orientation angle $\theta$. Therefore, by tracking the orientation and the baseline of the target vehicle, a position, orientation, velocity of the target vehicle may be constantly determined and tracked.

While certain embodiments of the present invention have been described in detail, those familiar with the art to which this invention relates will recognize various alternative designs and embodiments for practicing the invention as defined by the following claims.

What is claimed is:

1. A method of detecting and tracking objects using multiple radar sensors comprising:

detecting objects relative to a host vehicle from radar data generated by a sensing device, the radar data including Doppler measurement data;

forming clusters, by a processor, as a function of the radar data, each cluster representing a respective object;

classifying, by the processor, each respective object as stationary or non-stationary based on the Doppler measurement data of each object and a vehicle speed of the host vehicle; and applying target tracking, by the processor, on an object using Doppler measurement data over time in response to the object classified as a non-stationary object, otherwise, updating an occupancy grid in response to classifying the object as a stationary object.

2. The method of claim 1 wherein forming clusters comprises the following steps:
identifying each point detected by the first sensing device, each point including a location position and an associated range relative to the host vehicle;
assigning each point as a separate cluster;
comparing neighboring points and merging neighboring points into a same cluster if similarity metrics between the neighboring points is within a similarity threshold.

3. The method of claim 2 further comprising the step of indexing each point using a k-d tree.

4. The method of claim 3 further comprising the step of indexing each point using a hash look-up tree.

5. The method of claim 3 wherein the similarity metrics includes Doppler measurement data.

6. The method of claim 1 wherein classifying each respective object as stationary or non-stationary comprises the following steps:
identifying a velocity for each point within a cluster;
identifying a unit vector for each point with the cluster;
determining a range rate residue value for each point within the cluster;
determining that the cluster is a stationary cluster if a predetermined percent of the range rate residue values are within a residue threshold; otherwise determining that the cluster is a dynamic cluster.

7. The method of claim 6 wherein the velocity of each point within the cluster is determined by the following equation:

$$v_{xi} = y_i \omega_H - v_H$$

$$v_{yi} = -x_i \omega_H$$

where $v_{xi}$ is a lateral velocity of an $i^{th}$ point, $v_{yi}$ is a longitudinal velocity of the $i^{th}$ point, $y_i$ is a longitudinal coordinate relative to the vehicle of the $i^{th}$ point, $x_i$ is a latitudinal coordinate relative to the vehicle of the $i^{th}$ point, $\omega_H$ is yaw rate, and, $v_H$ is a speed.

8. The method of claim 7 wherein the range rate residue value is determined by the following equation:

$$\epsilon_i = |\vec{v}_i \cdot \vec{n}_i - d_i|$$

where $v_i$ is the determined speed, and $n_i$ is a unit vector.

9. The method of claim 6 wherein the predetermined percentage is substantially 80%.

10. The method of claim 1 wherein applying tracking comprises the following steps:
determining an orientation and position of the cluster at a previous instance of time using radar data;
determining an orientation and position of the cluster at a current instance of time using radar data;
determining a translation velocity in response to the orientation and position of the cluster at the previous and next instance of time;
updating an object tracking model of the cluster at the current instance of time utilizing the translation velocity.

11. The method of claim 10 wherein the transformation velocity is determined by the following equation:

$$v = \operatorname{argmin}_v \sum_{kj} a_{kj} \left( \frac{\|s_k - T_v(m_j)\|^2}{\sigma_1} + \frac{\|d_k - v_j \cdot n_j\|^2}{\sigma_2} \right)$$

where $s_k$ is a radar point, $m_j$ is a model point, $T_{v(n)}$ is an operator applying rigid motion during v during $\Delta t$ for a point x, $\alpha_{kj}$ is the probability that radar point $s_k$ is associated with model point $m_j$ (i.e., the measurement of the model point $m_j$), $d_k$ is the Doppler measurement of the radar point $s_k$, $n_j$ is the unit direction from the radar center to the model point $m_j$, and $v_j$ is the related velocity for the model point $m_j$.

12. The method of claim 11 wherein the related velocity for the model is determined by the following formula:

$$v_j = v_t + (m_j - o) \times \omega$$

where $(v_t, \omega)$ are translation and angular velocities in v.

13. The method of claim 12 wherein the object tracking model for the current instance of time is updated as a function of the transformation velocity determined for a current instance of time.

14. The method of claim 13 wherein an estimated motion of the cluster at a next instance of time is determined as a function of the updated object tracking model for the current instance of time.

15. The method of claim 14 wherein a Bayesian-based technique is applied to recursively estimate each object tracking model and each estimated motion.

16. The method of claim 10 wherein the orientation and position of the cluster is determined by a wheel hub detection technique comprising the steps of:
determining a baseline width between a front wheel hub and a rear wheel hub or a same side of a target vehicle;
computing an orientation of target vehicle relative to the host vehicle, the orientation based on the an alignment of the first object detection device and a baseline vector between the front and rear wheel hubs;
updating a position, orientation, and velocity of the target vehicle by tracking orientation and baseline of the target vehicle relative to the host vehicle.

17. The method of claim 1 wherein a plurality of sensing devices are used for detecting objects, wherein the data from the plurality of sensing devices are fused for updating an object model and tracking targets.

* * * * *